(12) United States Patent
Stout et al.

(10) Patent No.: US 7,334,773 B2
(45) Date of Patent: Feb. 26, 2008

(54) OUTFLOW VALVE HAVING A CABLE OPERATED CLOSURE MECHANISM

(75) Inventors: David E. Stout, Tucson, AZ (US); Gregor McDowall, Phoenix, AZ (US); David R. Minke, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 142 days.

(21) Appl. No.: 11/290,338

(22) Filed: Nov. 29, 2005

(65) Prior Publication Data
US 2007/0042697 A1    Feb. 22, 2007

Related U.S. Application Data

(60) Provisional application No. 60/709,017, filed on Aug. 16, 2005.

(51) Int. Cl.
*F16K 31/00*    (2006.01)
(52) U.S. Cl. ................................ 251/294; 251/305
(58) Field of Classification Search .............. 251/294, 251/305–308; 92/137
See application file for complete search history.

(56) References Cited

U.S. PATENT DOCUMENTS

| | | | |
|---|---|---|---|
| 2,324,236 A | 7/1943 | Price | |
| 2,826,218 A * | 3/1958 | Barlow et al. | ............. 251/294 |
| 2,830,521 A | 4/1958 | Fischer et al. | |
| 2,846,934 A | 8/1958 | Mauldin | |
| 3,960,032 A * | 6/1976 | Schiff | .......................... 251/294 |
| 4,225,110 A | 9/1980 | Akkerman et al. | |
| 4,295,630 A | 10/1981 | Card et al. | |
| 4,480,811 A | 11/1984 | Card et al. | |
| 4,811,752 A * | 3/1989 | Lyons et al. | ................. 251/294 |
| 4,869,459 A | 9/1989 | Bourne | |
| 5,007,330 A | 4/1991 | Scobie et al. | |
| 5,238,220 A * | 8/1993 | Shell et al. | .................. 251/294 |
| 5,263,449 A * | 11/1993 | Swartzendruber | ........... 251/294 |
| 5,263,684 A * | 11/1993 | McGuire | ..................... 251/294 |
| 6,062,534 A | 5/2000 | Eggleston | |
| 6,263,898 B1 * | 7/2001 | Vanderveen et al. | ......... 251/308 |
| 6,511,044 B2 * | 1/2003 | Kottke et al. | ................ 251/294 |
| 6,783,114 B2 * | 8/2004 | Sandhu et al. | .............. 251/294 |
| 6,814,337 B2 * | 11/2004 | Schmaltz | ..................... 251/294 |
| 2003/0107019 A1 | 6/2003 | Sandhu et al. | |

* cited by examiner

*Primary Examiner*—John Bastianelli
(74) *Attorney, Agent, or Firm*—Ingrassia Fisher & Lorenz

(57) ABSTRACT

An outflow valve includes a valve closure mechanism that automatically closes the outflow valve in the unlikely event the outflow valve actuator becomes inoperable. The valve closure mechanism includes a pulley, a load plate, a cable, and a spring. The pulley is coupled to a valve element is the outflow valve and is configured to eccentrically rotate therewith. The cable has a first end coupled to the pulley, and a second end coupled to the load plate. The spring is disposed between the valve and the load plate and surrounds a portion of the cable. The spring is configured to supply a bias force, via the load plate and the cable, to the pulley that biases the valve element toward the closed position.

18 Claims, 6 Drawing Sheets

OUTFLOW VALVE HAVING A CABLE OPERATED CLOSURE MECHANISM

CROSS-REFERENCES TO RELATED APPLICATIONS

This application claims the benefit of U.S. Provisional Application No. 60/709,017 filed Aug. 16, 2005.

TECHNICAL FIELD

The present invention relates generally to outflow valves, and more particularly to butterfly outflow valves.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, excessive amounts of air could leak out of the aircraft cabin causing it to decompress to an undesirably low pressure. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort.

To maintain aircraft cabin altitude within a relatively comfortable range, cabin pressure control systems may be equipped with one or more outflow valves. An outflow valve can assist in controlling cabin pressure by regulating air flow out of the cabin. One particular type of outflow valve that may be used is a butterfly outflow valve. A butterfly outflow valve typically includes a rotatable flapper or gate as the control element to regulate the flow of air out of the cabin. The flapper is coupled to a shaft that is rotationally mounted to the outflow valve body. An electromechanical actuator, which is coupled to the shaft, positions the flapper element in response to commands from a controller to thereby regulate the air flow out of the cabin.

Although the above-described type of outflow valve is believed to be generally safe and reliable, is fairly simple to design and construct, and thus fairly inexpensive, under certain circumstances it may exhibit certain drawbacks. One particular drawback is that some of these types of outflow valves may not automatically move to the closed position in the unlikely event that the actuator becomes inoperable. Although some outflow valve designs do include a closure mechanism to automatically move the valve to the closed position in this unlikely event, the closure mechanisms are typically relatively complex and expensive, and do not address backlash that may occur in the actuator.

Hence, there is a need for a relatively inexpensive and/or relatively non-complex outflow valve closure mechanism that automatically moves the outflow valve to the closed position in the unlikely event that the actuator becomes inoperable and/or reduces or eliminates outflow valve actuator backlash. The present invention addresses one or more of these needs.

BRIEF SUMMARY

The present invention provides a cabin pressure control system outflow valve that includes a relatively inexpensive and non-complex closure mechanism that automatically moves the outflow valve to the closed position in the unlikely event the actuator becomes inoperable and that reduces outflow valve actuator backlash.

In one embodiment, and by way of example only, an outflow valve includes a valve body, a valve element, and a closure mechanism. The valve body is adapted to mount on an aircraft fuselage and has at least a first flow port, a second flow port, and a flow passage therebetween. The valve element is rotationally disposed within the flow passage and is configured to rotate between a closed position and a plurality of open positions. The closure mechanism is coupled to the valve body and includes a pulley, a load plate, a cable, and a spring. The pulley is coupled to the valve element and configured to eccentrically rotate therewith. The cable has a first end coupled to the pulley, and a second end coupled to the load plate. The spring is disposed between the valve body and the load plate and surrounds a portion of the cable. The spring is configured to supply a bias force, via the load plate and the cable, to the pulley that biases the valve element toward the closed position.

In another exemplary embodiment, a valve closure mechanism for biasing a valve element toward a predetermined valve position includes a closure mechanism housing, a pulley, a load plate, a cable, and a spring. The pulley is adapted to couple to the valve element and is configured to eccentrically rotate therewith. The cable has a first end and a second end. The cable first end is coupled to the pulley, and the cable second end is coupled to the load plate. The spring is disposed between the closure mechanism housing and the load plate and surrounds a portion of the cable. The spring is configured to supply a bias force, via the load plate and the cable, to the pulley that biases the pulley to rotate in valve element toward the predetermined valve position.

Other independent features and advantages of the preferred outflow valve and closure mechanism will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
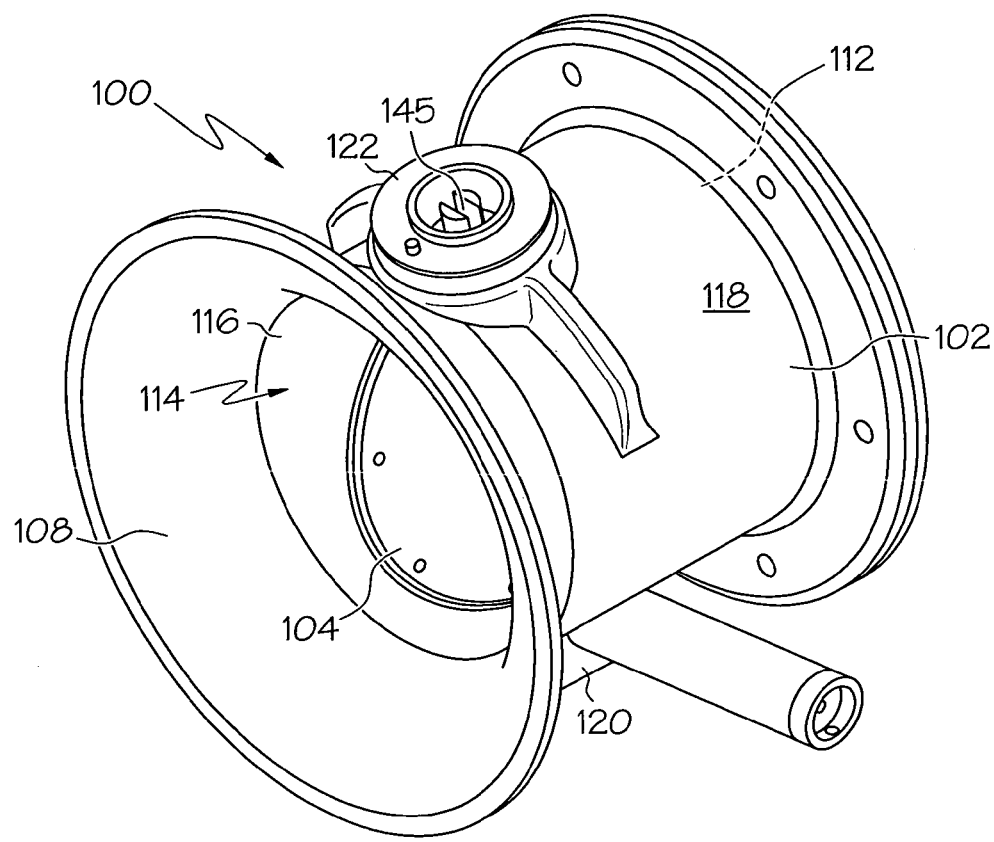
FIG. 1 is a perspective view of an exemplary embodiment of an outflow valve.
Figure 3:
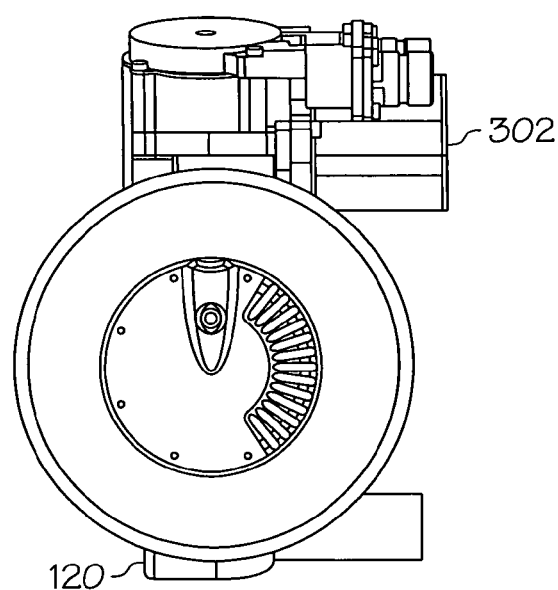
FIG. 3 is an end view of the outflow valve of FIG. 1 in a closed position and with an actuator assembly coupled thereto.
Figure 2:
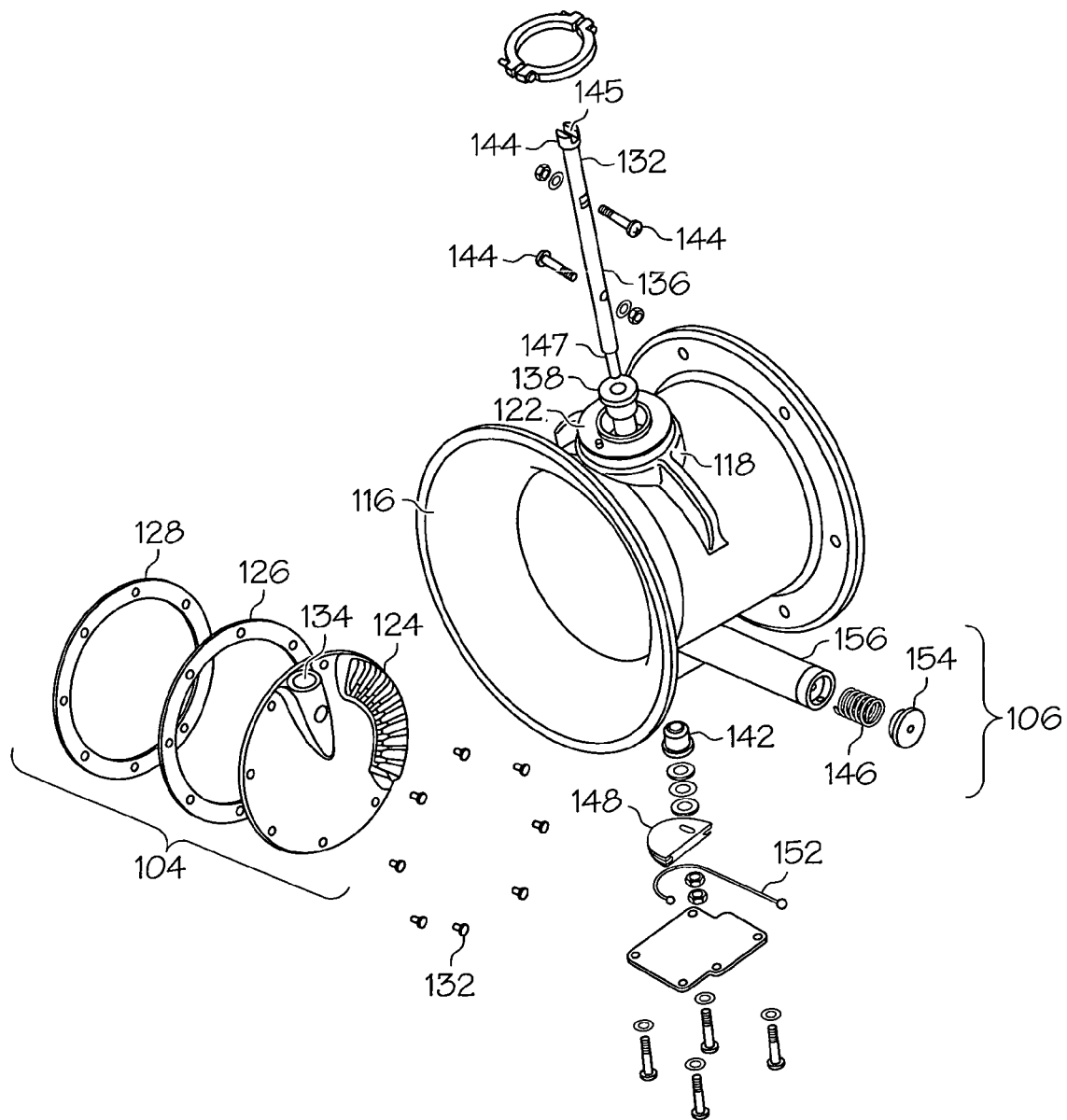
FIG. 2 is an exploded perspective view of the outflow valve of FIG. 1.

With reference to FIG. 1-3, an exemplary embodiment of an outflow valve 100 that may be used to control aircraft cabin pressure is shown and includes a valve body 102, a valve element 104, and a valve closure mechanism 106. The valve body 102 includes a first flow port 108, a second flow port 112, and a fluid flow passageway 114 that passes through the valve body 102 between the first and second flow ports 108 and 112. The valve body 102 is preferably adapted to mount to an aircraft fuselage (not shown), such that the first flow port 108 is in fluid communication with the aircraft cabin and the second flow port 112 is in fluid communication with the ambient environment outside the fuselage.

In a particular preferred embodiment, the valve body 102 is configured as a dual-wall body that includes an inner sleeve 116 disposed within an outer housing 118. The inner sleeve 116 may be made of any one of numerous materials, but is preferably made of a high strength material, and is preferably designed to handle the normal operational pressure loads and associated valve mounting loads. Some exemplary materials suitable for constructing the inner sleeve 116 include various metals, such as aluminum, or various composite materials, such as fiber-reinforced Polyetherimide (PEI) or fiber-reinforced Polyetheretherketon (PEEK).

The outer housing 118 may be constructed of any one of numerous suitable molded plastic/composite materials including, for example, fiber-reinforced PEI, fiber-reinforced PEEK, or any one of numerous other suitable composite materials. The outer housing 118 is preferably molded such that the first flow port 108 is a bell-shaped, which is a shape that increases air speed and reduces total pressure drop. The outer housing 118 is also molded to dimensions that reinforce the inner sleeve 116, and is further preferably molded to include, among other things, an actuator mount surface 122, and a closure mechanism housing 120.

The outer housing 118 can either be molded over the inner sleeve 116, such as during an injection molding process, or it can be bonded to the inner sleeve 116 using a suitable adhesive. It will be appreciated that if the inner sleeve 116 and outer housing 118 are bonded, the bond preferably does not fuse the inner sleeve 116 and outer housing 118 or form a single walled element. Rather, the bond is such that the dual-wall body configuration is maintained, which provides various advantages including, for example, redundancy.

The valve element 104 is rotationally disposed within the flow passage 114 and is configured to rotate through a plurality of positions, from a fully open position, as shown in FIG. 1, to a fully closed position, as shown in FIG. 3, to thereby control cabin pressure in the aircraft cabin into which it is installed. Although the valve element 104 may be variously configured to provide this functionality, in the depicted embodiment, it is configured as a butterfly plate assembly that includes a butterfly plate 124, a wiper seal 126, and a reinforcing ring 128, which are coupled together via a plurality of fasteners 132. The butterfly plate 124 may be constructed of a suitable plastic/composite material or metal that is molded to a desired geometry and with suitable interface features. Some suitable exemplary construction materials include fiber-reinforced PEI, fiber-reinforced PEEK, or aluminum. Some of the suitable interface features with which the butterfly plate 124 is preferably molded include, but are not limited to, a mounting interface for the reinforcing ring 126, and a shaft sleeve 134 that preferably extends through the butterfly plate 124 at an angle.

The wiper seal 126 is a flat annular ring made of, for example, dacron reinforced silicon material, and is disposed between the butterfly plate 124 and the reinforcing ring 128. It will be appreciated that this material and shape are merely exemplary, and that the wiper seal 126 could be constructed of any one of numerous other suitable materials and have any one of numerous other suitable shapes. The reinforcing ring 128 is preferably manufactured from steel, but could be formed of any one of numerous other suitable materials.

No matter the specific configuration of the valve element 104, in the depicted embodiment it is seen that the valve element 104 is rotationally disposed within the flow passage 114 via a shaft 136. More specifically, the shaft 136 is rotationally mounted on the valve body 102 via first and second shaft reinforcement sleeves 138, 142, and extends through valve element 104 via the shaft sleeve 134. In the depicted embodiment, the shaft reinforcement sleeves 138, 142, in addition to providing reinforcement to the shaft 136, also preferably function as bearings. As such, the shaft reinforcement sleeves 138, 142 are preferably implemented with appropriate friction and wear properties. In alternative embodiments, the shaft reinforcement sleeves 138, 142 do not function as bearings, and instead suitable ball bearings are included in the valve 100. In these alternative embodiments, the shaft reinforcement sleeves 138, 142 may be press fit onto, or tolerance fit over, the shaft 136.

The shaft 136 is preferably coupled to the butterfly plate 124 via a plurality of valve element mount fasteners 144. It will be appreciated, however, that the butterfly plate 124 could instead include an internal serration, or other means, to mate with the shaft 136. Moreover, although the shaft 136 is depicted as being constructed as a single shaft, it will be appreciated that it could also be constructed of two or more shafts. No matter the specific construction of the shaft 136, one of its ends 144 preferably includes an actuator interface 145, such as the depicted slot, that is configured to mate with a valve actuator 302 (see FIG. 3). The actuator 302, which may be an electromechanical, pneumatic, or hydraulic type of actuator, is used to supply a drive force to the shaft 136 to move the valve element 104 to a desired position. The other end 147 of the shaft 136 is configured to mate with the valve closure mechanism 106, a preferred embodiment of which will now be described.

The valve closure mechanism 106 includes the closure mechanism housing 120, a spring 146, a pulley 148, a cable 152, a load plate 154, and a spring guide 156. As shown most clearly in FIGS. 4 and 5, the closure mechanism housing 120 is molded to include includes two bosses 402, 404, a cable opening 406, a valve close stop 408, and a valve open stop 412. The first boss 402 is configured to align the spring 146 at one end thereof, and to provide a reaction surface for the spring 146, and the second boss 404 is configured to assist in aligning the spring guide 156. The cable opening 406 provides a passageway through which the cable 152 passes, and the valve close and open stops 408, 412 limit the extent to which the valve element 104 may travel in the close and open directions, respectively.

Figure 4:
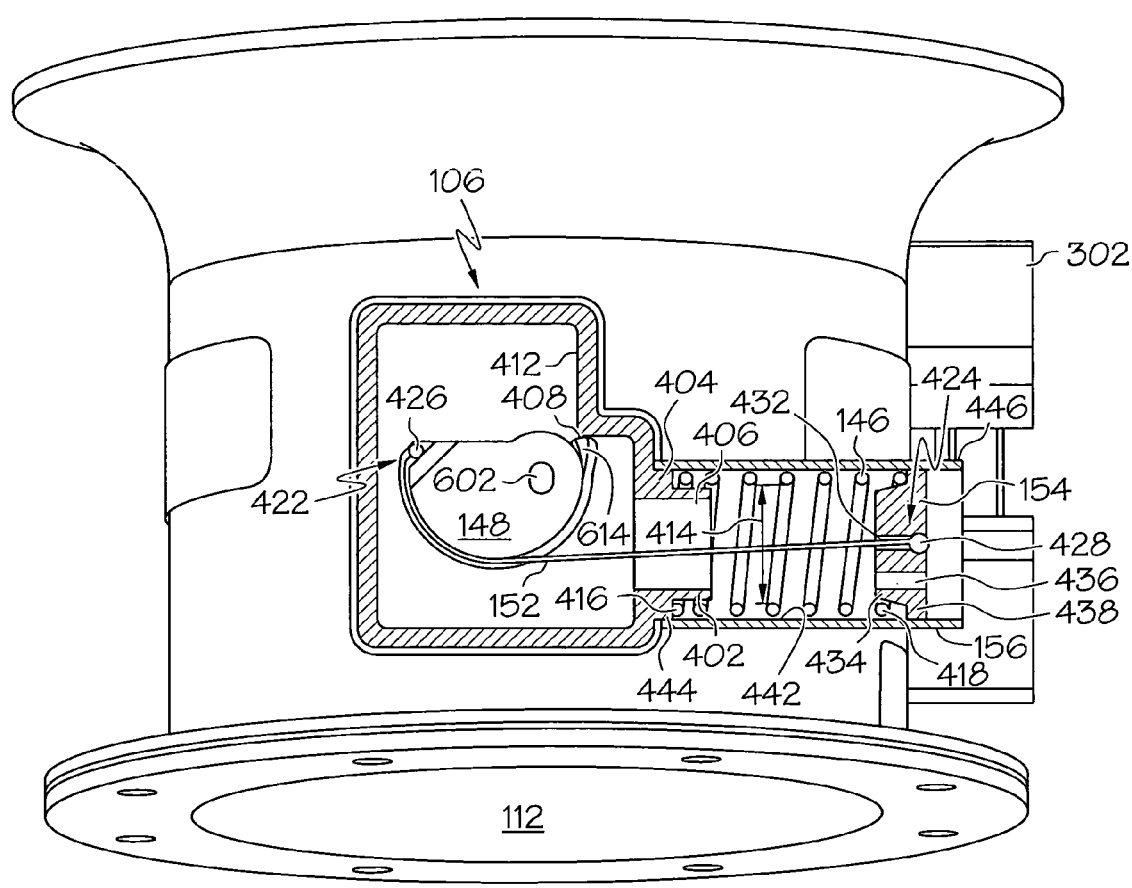
FIGS. 4 and 5 are views of the outflow valve of FIG. 1 depicting details of an exemplary valve closure mechanism in accordance with an embodiment of the present invention, and with the outflow valve in the closed position and open position, respectively.
Figure 5:
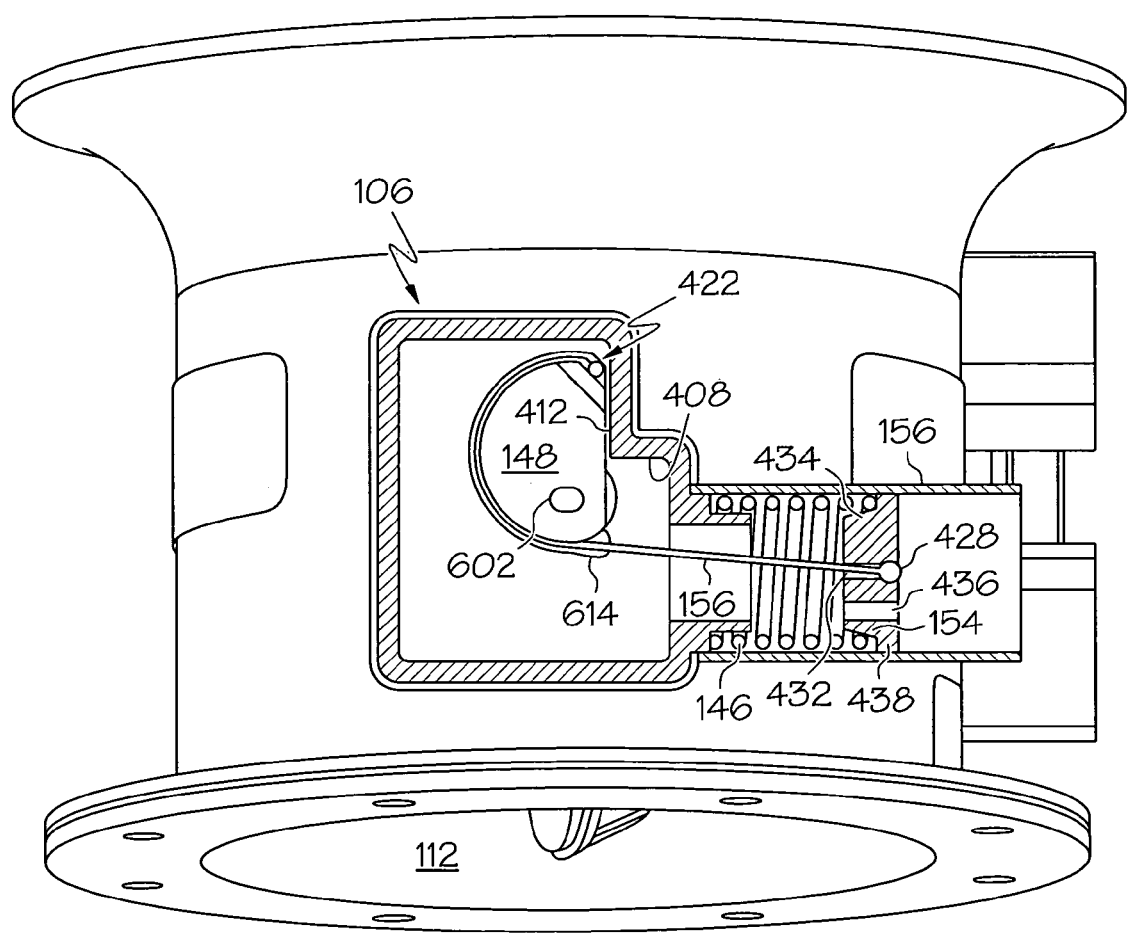

With continued reference to FIGS. 4 and 5, it is seen that the spring 146, which is preferably a commercially available compression spring, is coiled to have an inner diameter 414, a first end 416 and a second end 418. The spring first end 416 surrounds, and is partially aligned by, the closure mechanism housing first boss 402 and engages the closure mechanism housing second boss 404, and the spring second end 418 engages the load plate 154. As will be described in more detail further below, when the valve closure mechanism 106 is assembled the spring 146 supplies a bias force, via the cable 152 and the load plate 154, to the pulley 148 that biases the valve element 104 toward the closed position.

Figure 6:
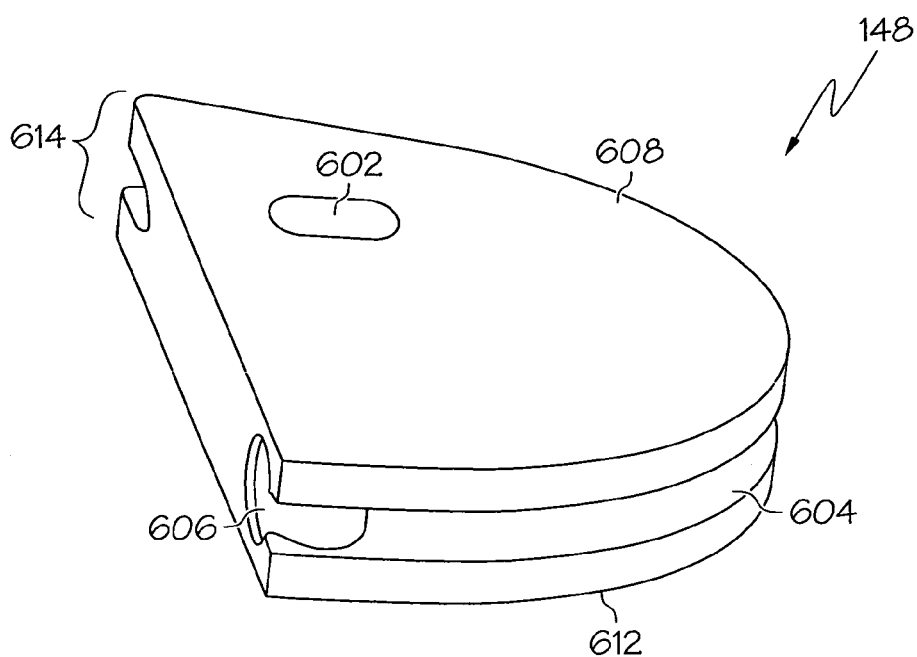
FIGS. 6 and 7 are perspective views of an exemplary pulley that may be used to implement the valve closure mechanism.
Figure 7:
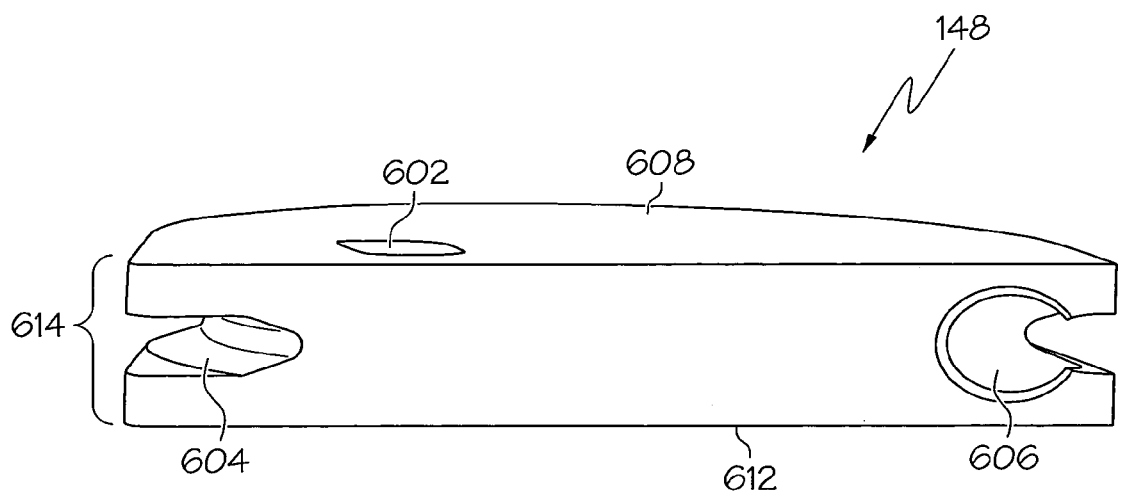

The pulley 148 is disposed within the closure mechanism housing 120 and is coupled to the shaft 136. The pulley 148, an embodiment of which is shown more clearly in FIGS. 6 and 7, includes a shaft opening 602, a cable groove 604 around a periphery thereof, and a cable insertion cavity 606. The shaft opening 602 extends through the pulley 148 substantially perpendicular to a top 608 and a bottom 612 surface thereof. The shaft opening 602 is preferably disposed at a location on the pulley 148 such that, when it is mounted on the shaft 136, and the shaft 136 rotates, the pulley 148 rotates eccentrically therewith. The cable groove 604 provides a seating surface within which the cable 152 rides, and the cable insertion cavity 606 provides an opening within which an end of the cable 152 is inserted and retained. In the depicted embodiment, the pulley 148 is constructed to additionally include a stop extension structure 614. The stop extension structure 614 extends radially outwardly from the pulley 148 and, as shown most clearly in FIG. 4, engages the closure mechanism housing valve close stop 408 when the valve element 104 is in the closed position.

With continued reference to FIG. 4 and further reference to FIG. 5, it is seen that the cable 152 includes a first end 422 and a second end 424. A first ball 426 is formed on or coupled to the cable first end 422, and a second ball 428 is formed on or coupled to the cable second end 424. The first ball 426 is retained within the cable insertion cavity 606, and the second ball 428 engages the load plate 154. In the depicted embodiment, the diameter of the first ball 426 is smaller than that of the second ball 428, which allows the cable first end 422 to be inserted into and through a cable opening 432 in the load plate 154. From the load plate 154, the cable 152 extends through the inner diameter 414 of the spring 146, through the closure mechanism housing cable opening 406, and partially around the pulley 148, within the cable groove 604, to the cable insertion cavity 606.

The spring 146 and load plate 154 are each disposed within the spring guide 156. The load plate 154 is configured to slide within the spring guide 156, and includes a boss 434, the previously described cable opening 432, one or more air release openings 436 (only one shown), and a guide engagement flange 438. The load plate boss 434 is disposed within the spring inner diameter 414 near the spring second end 418 and, together with the closure mechanism housing first boss 402 and the spring guide 156, provides appropriate alignment for the spring 146. The air release opening 436 extends through the load plate 154 and allows air to escape therethrough when, as will be described further below, the valve element 104 is moved to the full open position and the load plate 154 is pulled within the spring guide 156 toward the closure mechanism housing 120. The guide engagement flange 438 engages an inner peripheral surface 442 of the spring guide 156, and is configured to slide within the spring guide 156.

The spring guide 156 is preferably made of a length of stock aluminum or plastic tube, and includes a first end 444 and a second end 446. The spring guide first end 444 is preferably bonded to the closure mechanism housing second boss 404, and the spring guide second end 446 is preferably open and unsealed. It will be appreciated, however, that the spring guide second end 446 could alternatively be sealed with, for example, a cover. Because the load plate 154 is configured to slide within the spring guide 156, the spring guide inner peripheral surface 442 may be lubricated with a suitable lubricant depending, for example, on the particular materials used to construct the load plate 154 and spring guide 156. For example, if the load plate 154 and spring guide 156 are constructed of aluminum, a molybdenum disulfide solid film lubricant could be used. However, if the load plate 154 is constructed of, for example, a polyamide-imide (e.g., Torlon, or equivalent), and the guide tube 156 is constructed of anodized aluminum, then no lubricant may be included, if so desired.

Figure 8:
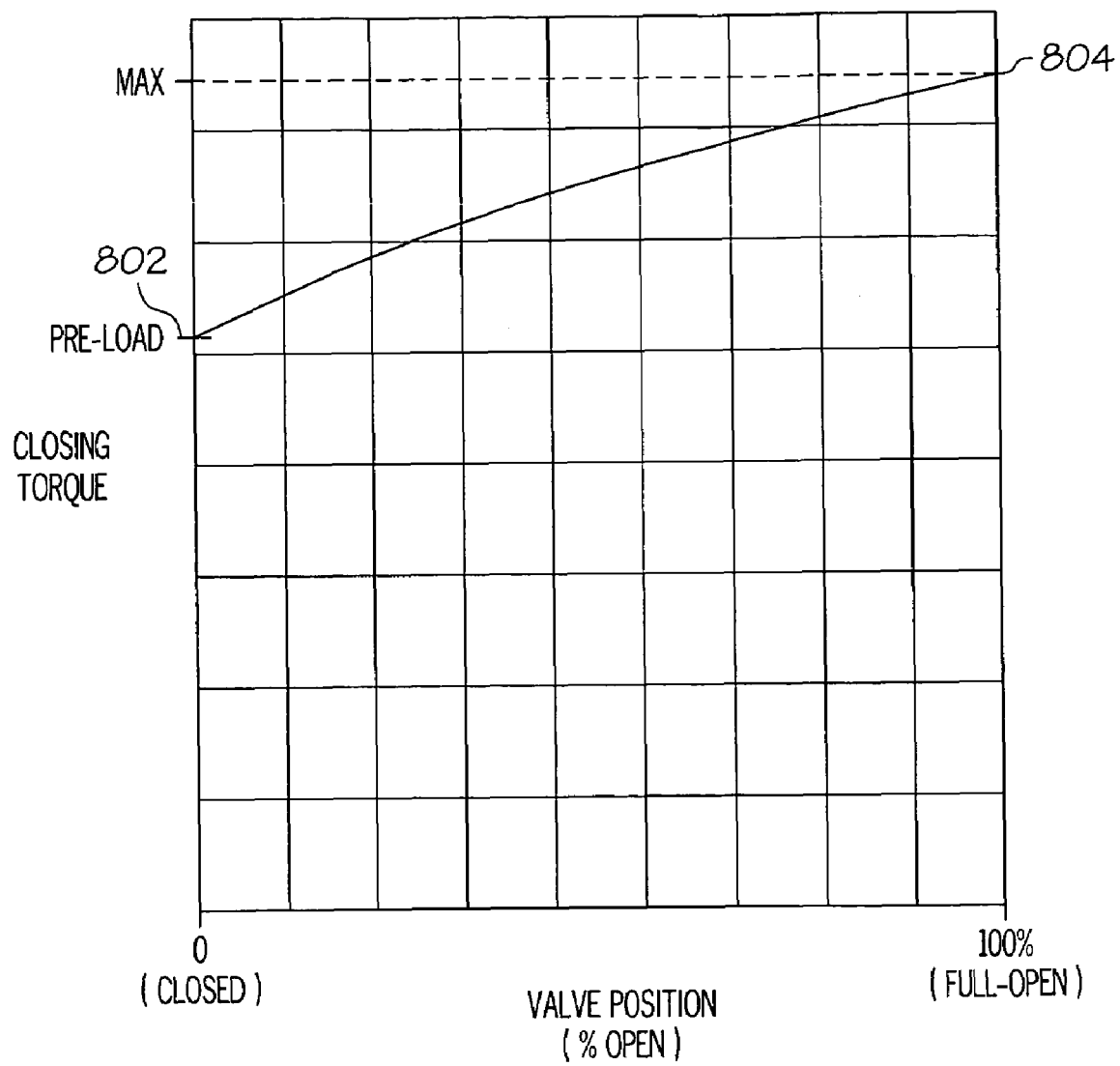
FIG. 8 is a graph depicting valve closure torque supplied from the valve closure mechanism of FIGS. 4 and 5 versus valve position.

The valve closure mechanism 106 continuously biases the valve element 104 toward its closed position, which is the position shown in FIGS. 3 and 4. As shown most clearly in FIG. 4, in the closed position the pulley stop extension structure 614 engages the closure mechanism housing valve close stop 408. As depicted in FIG. 8, the valve closure mechanism 106 is configured such that the spring 146 supplies a minimum pre-load bias force, via the load plate 154, cable 152, and pulley 148, to bias the valve element 104 toward the closed position. Stated another way, the valve closure mechanism 106 supplies a pre-load valve closure torque 802 to the valve element 104.

When the actuator 302 moves the valve element 104 out of the closed position and into an open position, the pulley 148 is rotated. As the pulley 148 rotates, the cable 152 pulls the load plate 154 toward the closure mechanism housing 120, compressing the spring 146. Thus, with reference once again to FIG. 8, it is seen that the valve closure torque supplied by the spring 146 to the valve element 104 increases from the pre-load valve closure torque 802 to a maximum valve closure torque 804 when, as shown in FIG. 5, the valve element 104 is in the full-open position. It will thus be appreciated that in the unlikely event the actuator 302 were to become inoperable, the valve closure mechanism 106 would automatically move the valve element 104 to the closed position.

The valve closure mechanism 106 described herein is a relatively inexpensive and non-complex mechanism that continuously biases the valve element 104 toward its closed position. The valve closure mechanism 106 is configured to automatically move the valve element 104 to the closed position in the unlikely event the actuator 302 becomes inoperable and, during normal valve 100 operation, reduces backlash in the actuator 302.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An outflow valve, comprising:
a valve body adapted to mount on the fuselage of an aircraft and having at least a first flow port, a second flow port, and a flow passage therebetween;
a valve element rotationally disposed within the flow passage and configured to rotate between at least a closed position and a full-open position; and
a closure mechanism coupled to the valve body, the closure mechanism including:
a pulley coupled to the valve element and configured to eccentrically rotate therewith, the pulley including a cable insertion cavity,
a load plate including a cable opening extending therethrough,
a cable extending through the load plate cable opening and having a first end, a second end, a first retention ball, and a second retention ball, the first retention ball coupled to the first end and disposed within the cable insertion cavity, the second retention ball coupled to the second end and engaging the load plate, and
a spring disposed between the valve body and the load plate and surrounding a portion of the cable, the spring configured to supply a bias force, via the load plate and the cable, to the pulley that biases the valve element toward the closed position
wherein the closure mechanism is configured such that, when the valve element is in the closed position, the spring supplies a non-zero pre-load force to the valve element.

2. The outflow valve of claim 1, further comprising:
a shaft rotationally mounted in the valve body and coupled to the valve element and the pulley.

3. The outflow valve of claim 2, wherein:
the shaft includes first and second ends;
the shaft first end is adapted to receive a rotational drive force; and
the shaft second end is coupled to the pulley.

4. The outflow valve of claim 3, further comprising:
an actuator coupled to the valve body and configured to supply the rotational drive force to the shaft first end.

5. The outflow valve of claim 1, further comprising:
a spring guide surrounding the spring and the load plate.

6. The outflow valve of claim 5, wherein:
the spring guide includes an inner peripheral surface;
the load plate includes a flange having an outer peripheral surface that slidingly engages the spring guide inner peripheral surface.

7. The outflow valve of claim 6, wherein:
the load plate further includes a boss; and
the spring surrounds the load plate boss and engages the load plate flange.

8. The outflow valve of claim 1, further comprising:
a closure mechanism housing coupled to the valve body, the closure mechanism housing surrounding at least the pulley and including a close stop and an open stop, the close stop and open stop each configured to limit the eccentric rotation of the pulley.

9. The outflow valve of claim 8, wherein:
the pulley engages the open stop when the valve element is in the full-open position; and
the pulley engages the close stop when the valve element is in the closed position.

10. The outflow valve of claim 9, wherein the pulley includes a stop extension structure that extends radially outwardly therefrom and engages the close stop when the valve element is in the closed position.

11. The outflow valve of claim 8, wherein:
the closure mechanism housing further includes a boss extending therefrom; and
the spring surrounds the closure mechanism boss and engages the closure mechanism housing.

12. The outflow valve of claim 1, wherein the spring is a compression spring.

13. A valve closure mechanism for biasing a valve element toward a predetermined valve position, the mechanism comprising:
a closure mechanism housing;
a pulley adapted to couple to the valve element and configured to eccentrically rotate therewith, the pulley including a cable insertion cavity;
a load plate including a cable opening extending therethrough;
a cable extending through the load plate cable opening and having a first end, a second end, a first retention ball, and a second retention ball, the first retention ball coupled to the first end and disposed within the cable insertion cavity, the second retention ball coupled to the second end and engaging the load plate; and
a spring disposed between the closure mechanism housing and the load plate and surrounding a portion of the cable, the spring configured to supply a bias force, via the load plate and the cable, to the pulley that biases the pulley to rotate the valve element toward the predetermined valve position
wherein the closure mechanism is configured such that, when the valve element is in the closed position, the spring supplies a non-zero pre-load force to the valve element.

14. The mechanism of claim 13, wherein the predetermined valve position is a closed position.

15. The outflow valve of claim 13, further comprising:
a spring guide surrounding the spring and the load plate and coupled to the closure mechanism housing.

16. The outflow valve of claim 15, wherein:
the spring guide includes an inner peripheral surface;
the load plate includes a flange having an outer peripheral surface that slidingly engages the spring guide inner peripheral surface.

17. The outflow valve of claim 16, wherein:
the load plate further includes a boss; and
the spring surrounds the load plate boss and engages the load plate flange.

18. The outflow valve of claim 13, wherein:
the closure mechanism housing surrounds at least the pulley and includes a close stop and an open stop, the close stop and open stop each configured to limit the eccentric rotation of the pulley; and
the pulley includes a stop extension structure that extends radially outwardly therefrom and engages the close stop when the valve element is in a closed position.

* * * * *